US011516016B2

(12) United States Patent
Oswalt

(10) Patent No.: US 11,516,016 B2
(45) Date of Patent: *Nov. 29, 2022

(54) METHOD AND SYSTEM FOR SIGNING AND AUTHENTICATING ELECTRONIC DOCUMENTS VIA A SIGNATURE AUTHORITY WHICH MAY ACT IN CONCERT WITH SOFTWARE CONTROLLED BY THE SIGNER

(71) Applicant: Signix, Inc., Chattanooga, TN (US)

(72) Inventor: Robert T. Oswalt, Decatur, GA (US)

(73) Assignee: Signix, Inc., Chattanooga, TN (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/905,041

(22) Filed: Jun. 18, 2020

(65) Prior Publication Data

US 2020/0403806 A1   Dec. 24, 2020

Related U.S. Application Data

(63) Continuation of application No. 15/852,029, filed on Dec. 22, 2017, now Pat. No. 10,728,039, which is a (Continued)

(51) Int. Cl.
*H04L 9/40* (2022.01)
*H04L 9/32* (2006.01)
*H04L 9/08* (2006.01)

(52) U.S. Cl.
CPC ............ *H04L 9/3247* (2013.01); *H04L 9/083* (2013.01); *H04L 9/0861* (2013.01);
(Continued)

(58) Field of Classification Search
CPC ..... H04L 9/3247; H04L 9/083; H04L 9/0861; H04L 9/3263; H04L 63/0823; H04L 63/123; H04L 2463/082
See application file for complete search history.

(56) References Cited

U.S. PATENT DOCUMENTS 5,553,145 A   9/1996  Micali
5,615,268 A   3/1997  Bisbee et al.
(Continued)

OTHER PUBLICATIONS

106th Congress, Electronic Signatures in Global and National Commerce Act, Public Law 106-229, Jun. 30, 2000, p. 464-476, S. 761, Senate and House of Representatives of the United States of America in Congress, USA.
(Continued)

*Primary Examiner* — Ghodrat Jamshidi
(74) *Attorney, Agent, or Firm* — Baker Donelson; Carl M. Davis, II

(57) ABSTRACT

A system and method for signing and authenticating electronic documents using public key cryptography applied by one or more server computer clusters operated in a trustworthy manner, which may act in cooperation with trusted components controlled and operated by the signer. The system employs a presentation authority for presenting an unsigned copy of an electronic document to a signing party and a signature authority for controlling a process for affixing an electronic signature to the unsigned document to create a signed electronic document. The system provides an applet for a signing party's computer that communicates with the signature authority.

41 Claims, 3 Drawing Sheets

System for Signing and Authenticating Electronic Documents

Related U.S. Application Data continuation of application No. 15/132,769, filed on Apr. 19, 2016, now Pat. No. 9,853,818, which is a continuation of application No. 14/334,255, filed on Jul. 17, 2014, now Pat. No. 9,325,508, which is a continuation of application No. 13/933,655, filed on Jul. 2, 2013, now Pat. No. 8,819,813, which is a continuation of application No. 12/794,458, filed on Jun. 4, 2010, now Pat. No. 8,484,723.

(60) Provisional application No. 61/184,525, filed on Jun. 5, 2009.

(52) U.S. Cl.
CPC ........ *H04L 9/3263* (2013.01); *H04L 63/0823* (2013.01); *H04L 63/123* (2013.01); *H04L 2463/082* (2013.01)

(56) References Cited

U.S. PATENT DOCUMENTS

| | | | |
|---|---|---|---|
| 5,629,982 | A | 5/1997 | Micali |
| 5,850,442 | A * | 12/1998 | Muftic ............... G06Q 20/3821 713/156 |
| 5,872,848 | A * | 2/1999 | Romney ............... H04L 9/3247 705/76 |
| 6,137,884 | A | 10/2000 | Micali |
| 6,289,460 | B1 | 9/2001 | Hajmiragha |
| 6,401,206 | B1 | 6/2002 | Khan |
| 6,944,648 | B2 | 9/2005 | Cochran et al. |
| 6,988,196 | B2 * | 1/2006 | Cromer ................... G06F 21/31 713/155 |
| 7,177,847 | B2 | 2/2007 | Atkinson |
| 7,237,114 | B1 * | 6/2007 | Rosenberg ........... G06Q 20/401 713/193 |
| 7,941,667 | B2 * | 5/2011 | Miyazaki ................ G06F 21/64 713/176 |
| 8,103,867 | B2 | 1/2012 | Spitz |
| 8,145,909 | B1 * | 3/2012 | Agrawal ............... H04L 9/3247 713/180 |
| 8,239,496 | B2 | 8/2012 | Peterson et al. |
| 8,655,961 | B2 | 2/2014 | McCabe et al. |
| 8,949,706 | B2 | 2/2015 | McCabe et al. |
| 9,646,150 | B2 | 5/2017 | Toth |
| 2002/0069174 | A1 * | 6/2002 | Fox ......................... G06Q 30/06 705/52 |
| 2002/0162003 | A1 | 10/2002 | Ahmed |
| 2003/0078880 | A1 * | 4/2003 | Alley .................... G06F 21/645 705/38 |
| 2003/0177361 | A1 * | 9/2003 | Wheeler ................ G06Q 20/00 713/176 |
| 2004/0102959 | A1 * | 5/2004 | Estrin ..................... G06F 21/64 704/8 |
| 2005/0188204 | A1 | 5/2005 | Rice |
| 2005/0132195 | A1 | 6/2005 | Dietl |
| 2005/0132196 | A1 | 6/2005 | Dietl |
| 2005/0177389 | A1 * | 8/2005 | Rakowicz ........... H04L 63/0435 713/157 |
| 2007/0043949 | A1 * | 2/2007 | Bugbee ................ H04L 9/3247 713/176 |
| 2007/0079139 | A1 | 4/2007 | Kim |
| 2008/0016357 | A1 | 1/2008 | Suarez |
| 2008/0243662 | A1 * | 10/2008 | Subramaniam ........ G06Q 40/00 705/38 |
| 2009/0094460 | A1 | 4/2009 | Dedek |
| 2009/0276829 | A1 | 11/2009 | Sela |
| 2010/0040234 | A1 * | 2/2010 | Alrabady ............ H04W 12/069 380/278 |
| 2010/0169653 | A1 * | 7/2010 | Takenaka .............. H04L 9/3247 713/176 |
| 2011/0289318 | A1 * | 11/2011 | Zhang ................... H04L 9/3247 713/176 |
| 2014/0032913 | A1 * | 1/2014 | Tenenboym .......... H04L 9/3247 715/764 |
| 2014/0331041 | A1 | 11/2014 | Oswalt |
| 2014/0365765 | A1 | 12/2014 | Oswalt |
| 2014/0365766 | A1 | 12/2014 | Oswalt |
| 2016/0023402 | A1 | 8/2016 | Oswalt |

OTHER PUBLICATIONS

Kreizman, Gregg, The Electronic Signature Market Is Posed to Take Off, Gartner, May 21, 2012, p. 1-9, G000234939, Gartner, Inc., USA.

Herzberg, A. and Naor, D., Surf'N'Sign: Client Signatures on Web Documents, IBM Systems Journal, 1968, p. 61-71, vol. 37, No. 1, IBM, USA.

Doja, M. N., et al., Electronic Authority Variation, International Journal of Computer Science and Information Security, 2009, 5 pgs., vol. 4, No. 1 & 2, India.

Shum, K and Wei, V, "A Strong Proxy Signature Scheme With Proxy Signer Privacy Protection", Proceedings of 11th IEEE International Workshops on Enabling Technologies: Infrastructure for Collaborative Enterprises (2002).

State of Arizona, Signature Dynamics Electronic Signing Policy for Electronic Signature Use, State of Arizona, Policy Authority, Office of the Secretary of State (Apr. 2001).

European Telecommunications Standards Institute, Signature Policies Report, ETSI TR 102 041, v1.1.1, Reference DTR/SEC-004022, ETSI, 650 Route des Lucioles, F-06921 Sophia Antipolis Cedex, France (2002).

European Telecommunications Standards Institute, TC Security-Electronic Signatures and Infrastructures (ESI); XML format for signature policies, ETSI TR 102 038, v1.1.1, Reference DTR/SEC-004011, ETSI, 650 Route des Lucioles, F-06921 Sophia Antipolis Cedex, France (2002).

European Telecommunications Standards Institute, Mobile Commerce (M-COMM); Mobile Signatures; Business and Functional Requirements, ETSI TR 102 203, v1.1.1. Reference DTR/M-Comm-003, ETSI, 650 Route des Lucioles, F-06921 Sophia Antipolis Cedex, France (2003).

European Telecommunications Standards Institute, Electronic Signatures and Infrastructures (ESI); ASN.1 format for signature policies; ETSI TR 102 272, v1.1.1, Reference DTR/ESI-000022?, ETSI, 650 Route des Lucioles, F-06921 Sophia Antipolis Cedex, France (2003).

European Telecommunications Standards Institute, Electronic Signatures and Infrastructures (ESI); CMS Advanced Electronic Signatures (CAdES), ETSI TR 102 733 v1.8.1, Reference DTR/ESI-000068, ETSI, 650 Route des Lucioles, F-06921 Sophia Antipolis Cedex, France (2009).

Ross, J., Pinkas, D., Pope, N., Electronic Signature Policies, RFC 3125, The Internet Society (2001).

\* cited by examiner

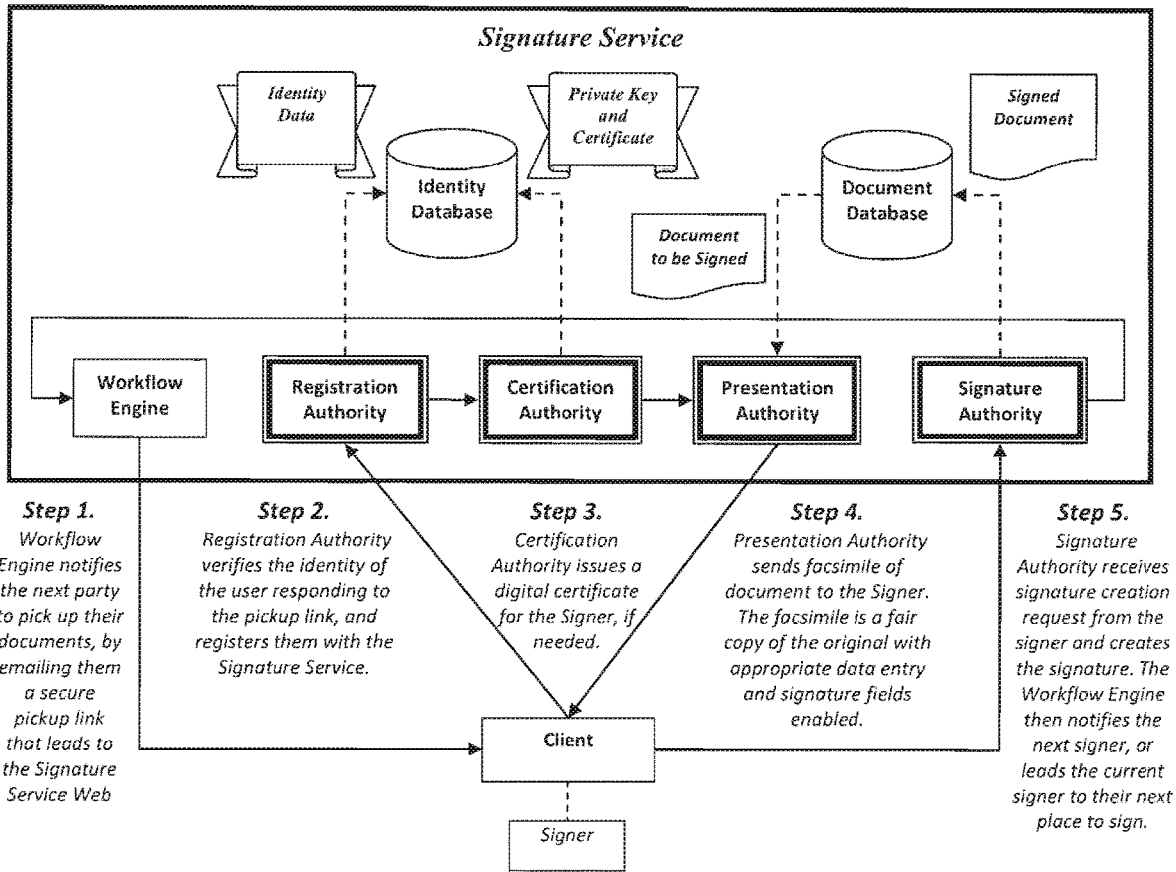
FIG. 1  System for Signing and Authenticating Electronic Documents

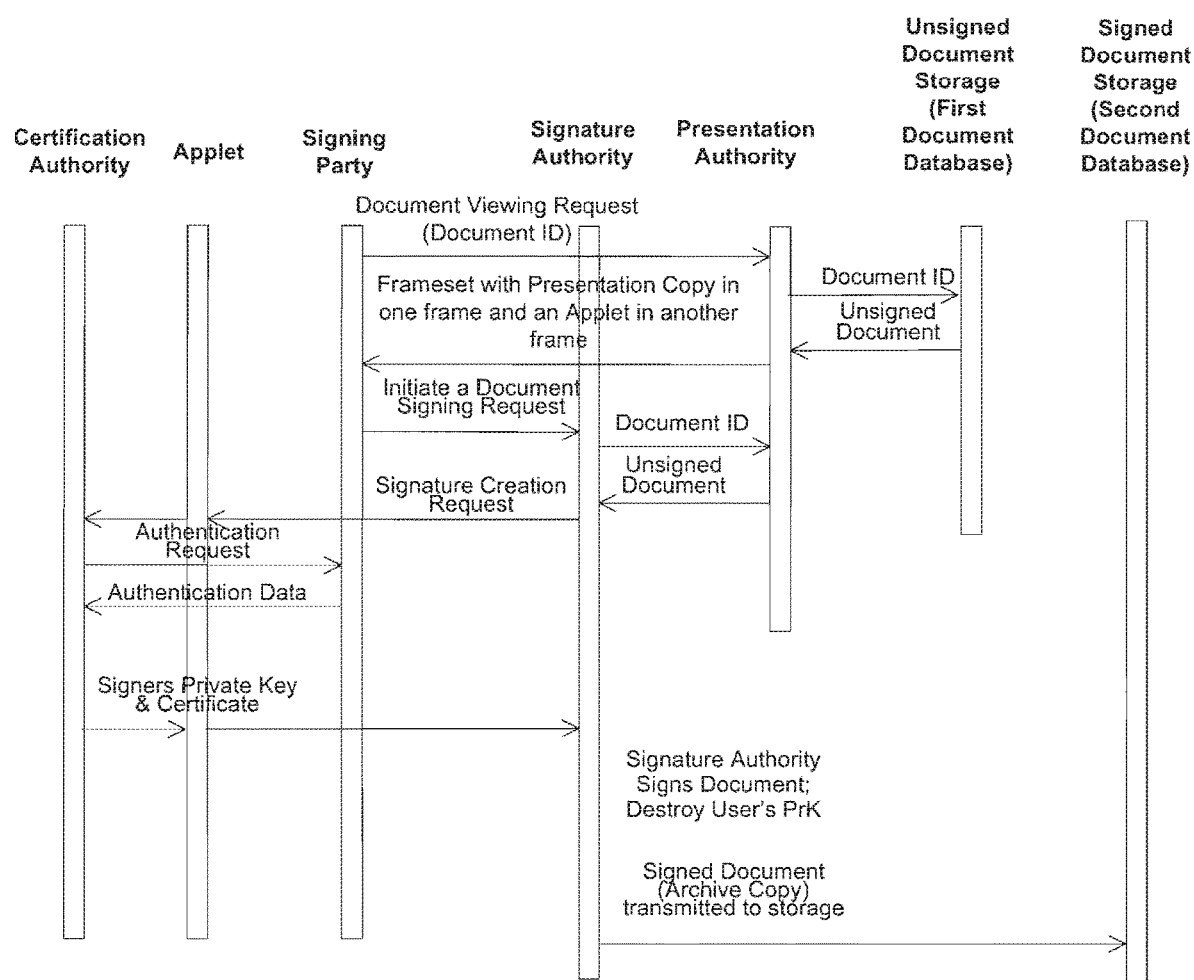
*FIG. 2*   Signing Process

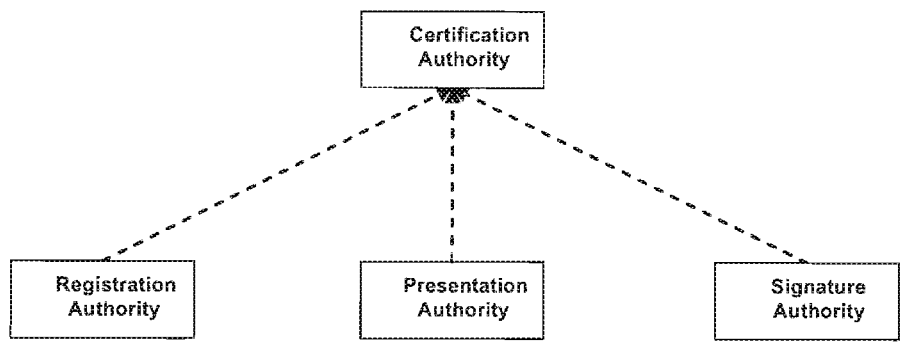
FIG. 3    Certification Authority with Subordinate Registration, Presentation, and Signature Authorities
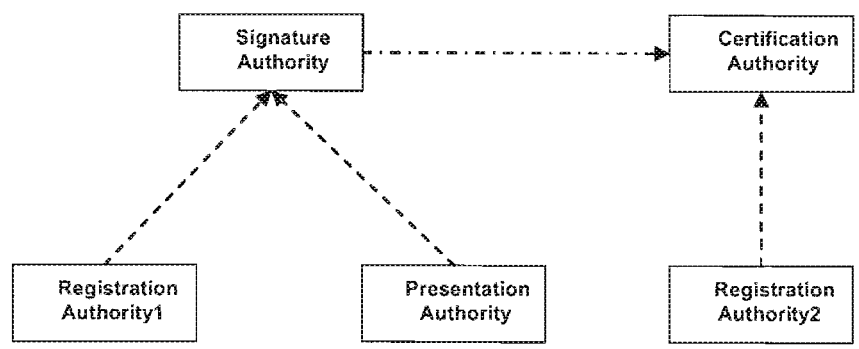
FIG. 4    Signature Authority with Subordinate Registration and Presentation Authorities

METHOD AND SYSTEM FOR SIGNING AND AUTHENTICATING ELECTRONIC DOCUMENTS VIA A SIGNATURE AUTHORITY WHICH MAY ACT IN CONCERT WITH SOFTWARE CONTROLLED BY THE SIGNER

CROSS REFERENCE TO RELATED APPLICATION

This application claims priority to U.S. Provisional Application No. 61/184,525, filed Jun. 5, 2009, which is incorporated herein by reference.

TECHNICAL FIELD

This invention relates to a system and method for signing, storing, and authenticating electronic documents.

BACKGROUND

The U.S. electronic signature law, "Electronic Signatures in Global and National Commerce Act," defines an electronic signature as "an electronic sound, symbol, or process, attached to or logically associated with a contract or other record and executed or adopted by a person with the intent to sign the record."

Public Key Infrastructure (PKI) has been used to create high quality electronic signatures on electronic documents. A PKI may consist of a set of key pairs from asymmetric cryptosystems where one key of the pair is identified as public and one as private, a set of entities, called subjects, that control private keys, and a set of rules or policies, defined by a Policy Authority, for managing the key pairs. The minimum set of rules typically stipulates that each private key must be kept as a secret of its subject and must be applied only under direction of the subject. The public key of the pair may be published or otherwise made known to other entities, along with information identifying its subject. Trustworthy entities called Certification Authorities may bind subject identity information to a public key using a data structure called a digital certificate, and another trustworthy entity called a Registration Authority may confirm the accuracy of the information identifying the subject. Certification Authorities may be arranged in a network of trust relationships so that a party can trust the content of digital certificates made by one Certification Authority based on trust they may have of another Certification Authority.

A digital signature on a portion of data is a value formed by applying a private key to a secure digest of the data. Parties receiving the data, the digital signature, and the digital certificate of the subject whose private key was used in formation of the digital signature can perform a process called "signature verification" that can confirm whether the subject's private key formed the signature and whether the data has changed since formation of the signature.

These features of digital signatures can be used in electronic signature systems to form high-quality electronic signatures on electronic documents. A typical form of such a signature can be made using a private key whose subject is the signer, and a corresponding digital certificate certifying the signer as the subject. In this form of electronic signature, the to be signed document and possibly other relevant information is taken as the portion of data to be digitally signed. A digital signature is formed on this data using the private key, and the electronic signature consists of the digital signature and the digital certificate, where the subject of the certificate is the signer of the electronic signature.

Any party wishing to rely on an electronic signature so formed can use the digital signature verification process to verify the signature and determine, with some degree of confidence, the accuracy of the signer identification and whether the document has changed since it was signed.

The degree of confidence that can be achieved depends on many factors, including the policies the PKI has for managing keys and the degree to which these policies are actually followed by all participants. A trustworthy PKI typically includes a system of contracts and agreements to enforce the policies, and system of audits on the authorities to confirm their compliance.

In addition to creating electronic signatures, electronic signature systems may also provide a comprehensive set of related services, including the following:

eDelivery and workflow control. Bind multiple documents into a single transaction and securely deliver them to the parties that have to act on them. Parties may only be able to perform specific actions intended for them. The order of performance of these actions may be controlled, as may the order of delivery to the parties.

eSignature. Both preregistered and first-time users may be able to electronically sign the delivered documents.

Hidden PKI. Although the signatures can be based on PKI digital signatures, no knowledge or awareness of PKI may be necessary for users.

Infrastructure-free. The system may, in some cases, be used to overcome limitations on client document handling and display software, such as inability to control the order of performing actions such as signing, and inability to create an electronic signature of the type desired, so that those receiving and signing documents don't need to install anything new.

Multi-format. Different document formats can potentially be mixed in the same transaction.

Audit trails. A trustworthy system can maintain secure audit trails of the performance of the critical steps of the eDelivery and eSignature process.

Authoritative metadata. An authoritative source may be able to provide other trustworthy signature metadata, such as, for example, the actual signing time, and may be able to perform some of the functions of a witness or notary.

U.S. Pat. No. 7,237,114 describes aspects of a server-based electronic signature system that can create PKI-based electronic signatures while providing all of these services. The disclosure of this patent is incorporated herein by reference and made a part hereof.

Systems also exist for creating electronic signatures using a client-side process. In these systems, typically a program installed on the client for displaying electronic documents includes a facility for forming an electronic signature in an indicated location in documents.

Such systems may have the ability to form strong cryptographic signatures using a PKI private key. This private key and a corresponding digital certificate is may be kept on the client. A user who wants to sign a document must typically first go to a Certification Authority and have a key pair and corresponding certificate provisioned into their client machine. The provisioning process typically exposes the user to PKI, and requires that they have some knowledge of the provisioning process and private key management.

Client-side components have also typically been more vulnerable to problems, such as attacks by malicious entities that may cause improper operation of their components. Such attacks can lead to, for example, compromise of private keys.

However, client machines can include hardware components that are able to make client facilities more trustworthy. Such components may be able to offer facilities that include the following:
1. They may form a root of trust on the client, allowing other entities to verify that other hardware and software components exist in an acceptable form.
2. They may facilitate secure, hardware-based storage of private data such as cryptographic keys.
3. They may be able to form or verify digital signatures.

Trusted Platform Modules (TPMs), commonly included in new client computer systems, are one category of such components.

Trustworthy client components can be used in providing trustworthy multi-factor authentication of a user. Multi-factor authentication schemes typically involve two or more of the following authentication factors:
1. Something you know.
2. Something you have.
3. Something you are.

For example, a client TPM may provide secure user authentication by supporting the above authentication factors using mechanisms that includes the following facilities:
1. Something you know: Secure entry and communication of passwords.
2. Something you have: Secure storage and application of private keys in a way that can demonstrate possession of the key or of the hardware containing it without revealing the key.
3. Something you are: Secure application of biometric hardware.

Client computer systems that include trustworthy components may be able to apply any or all of the above authentication factors when creating the electronic signature of a user, a feature that is not achievable with server components alone. However, client-based electronic signature systems may require installation of new components beyond those typically available in a consumer machine in order to participate in a signature process that provides all of the related services described above. This need for missing components limits the use of such systems in Web-based consumer interactions.

Therefore, a need exists for an electronic signature system that can provide the comprehensive services listed above, combined with the strong signer authentication available from common trustworthy client facilities, without requiring the client to install new components.

The present invention meets a need in the art by providing a system for verifying the authenticity of a digital signature associated with an electronic document, such that a relying party is enabled to rely on the fact that a signing party reliably signed the electronic document. The system comprises a certification authority computer system configured with software instructions that upon execution generate a digital certificate certifying a cryptographic key pair of a private key and a public key for a signing party. A storage device stores the private key and the digital certificate for use when constructing a digital signature for indicating execution of a to-be-signed electronic document as directed from time-to-time by the signing party to create a digitally signed electronic document. A computer program operative on a communications network by a communications network-connected computer used by the signing party for execution of the to-be-signed electronic document and communicating with a signature authority computer system. The signing party's computer system having software instructions that, upon execution in response to a first action from the signing party, provides a document signing request to the signature authority computer system, which document signing request identifies the to-be-signed electronic document. The signature authority computer system having software instructions that upon execution (i) obtains a copy of the to-be-signed electronic document in response to receipt of the document signing request; (ii) forms a signature data structure that includes a hash of the to-be-signed electronic document; (iii) sends the signature data structure to a trustworthy component on the signing party's computer system; and (iv) receives a digitally signed signature data structure from the trustworthy component for creating a digitally signed electronic document with the to-be-signed electronic document and the digitally signed signature data structure. The trustworthy component on the signing party's computer system configured with instructions for: (i) authenticating the signing party; (ii) upon authentication, digitally signing the signature data structure with the private key of the signing party; and (iii) transmitting the digitally signed signature data structure to the signature authority computer system as the digital signature for the to-be-signed document.

Objects, advantages, and features of the present invention will become apparent upon a reading of the following detailed description in reference to the drawings and the appended claims.

SUMMARY OF THE CLAIMED INVENTION

Briefly described, aspects of the present invention relate to a computer-implemented system and method for verifying the authenticity of a digitally-generated signature associated with an electronic document, such that a relying party is enabled to rely on the fact that a signing party reliably signed the electronic document. A process for creating a signed electronic document comprises various steps, including:
(a) providing an unsigned document storage database for storing unsigned electronic documents,
(b) providing a signed document storage database for storing electronic documents that have been electronically signed by a signing party;
(c) providing an Internet computer browser computer program operative on an Internet-connected computer used by a prospective signing party for an electronic document, the browser program operative to execute applets provided from an external source;
(d) providing a certification authority for the Internet-connected computer used by the prospective signing party, the certification authority comprising cryptographic hardware protecting a certification authority private key and a corresponding digital certificate;
(e) providing a signature authority for coordinating construction of an electronic signature for an unsigned electronic document in conjunction with actions of a signing party to create a signed electronic document; and
(f) providing a presentation authority for retrieving an unsigned electronic document from the unsigned document storage database and for constructing a new unsigned document as a presentation copy of an original unsigned document,
wherein the presentation copy has the same appearance as the original unsigned document, and wherein the presentation copy includes a means for the signing party to send a document signing request to the signature authority.

Given the foregoing recited authorities and elements, the process for electronically signing an unsigned document begins with an action by a signing party to sign a document. In response to the action from the signing party operating the computer with browser program, a request is sent from the browser program to view an unsigned document to the presentation authority. At the presentation authority, in response to a received request to view an unsigned document, an unsigned document is retrieved from the unsigned document storage database. A presentation copy of the unsigned document is created and wrapped in a frameset that also contains an applet for communications between the signature authority and the certification authority on the signing party's computer.

At the signing party's browser program, the frameset and associated presentation copy of the unsigned document are displayed. In response to an action from the signing party, the presentation copy is displayed in the signing party's browser program, which then provides a document signing request from the signing party's computer to the signature authority. The document signing request includes an identifier of the unsigned document from which the presentation copy was made and an identifier of the location for placement of the signature within the unsigned document.

At the signature authority, in response to receipt of the document signing request, the identifier of the unsigned document is provided to the presentation authority. At the presentation authority, and in response to the receipt of the identifier of the unsigned document, an unsigned electronic document corresponding to the identifier of the unsigned document is retrieved and provided to the signature authority.

At the signature authority, a signature creation request is provided from the signature authority to the applet in the frameset on the signing party's computer. Via the applet at the signing party's computer, the signature creation request is provided to the certification authority on the signing party's computer.

At the certification authority, a key pair is generated and a user interface is opened on the signing party's computer requesting input of authentication information from the signing party. At the signing party's computer, authentication information input from the signing party is received. In response to the authentication information input from the signing party, at the certification authority the public key of the pair is certified under a certification authority digital certificate identifying the signing party as subject. The newly generated private key and corresponding digital certificate is then provided to the applet at the signing party's computer.

At the applet at the signing party's computer, the private key and certificate are transmitted to the signature authority. At the signature authority, the received private key and certificate are used to create a digital electronic signature on the unsigned document provided by the presentation authority, in the location specified by the document signing request. Finally, at the signature authority, the private key is destroyed, and the signed electronic document is transmitted to the signed document storage database for access by a relying party.

BRIEF DESCRIPTION OF THE DRAWING FIGURES

FIG. 1 is a block diagram of an Electronic Signature System with Presentation and Signature Authorities illustrating embodiments of the inventions.

FIG. 2 illustrates a signing process of an electronic document in accordance with aspects of the present invention.

FIG. 3 illustrates a certification authority with subordinate registration, presentation, and signature authorities in accordance with an aspect.

FIG. 4 illustrates a signature authority with subordinate registration and presentation authorities.

DESCRIPTION OF THE INVENTIONS

The present invention provides several means by which an electronic signature can be created under the purview of a Signature Authority. The Signature Authority may work within the context of an electronic signature system, helping it provide comprehensive signature-related services, and may take advantage of trustworthy client components to improve the overall trustworthiness of the signatures.

A Signature Authority is a trustworthy third party that participates in the formation of an electronic signature in a way that is critical to the trustworthiness of the resulting signature. A Signature Authority takes a to be signed document and a signature creation request, comprised (implicitly or explicitly) of an instruction to sign a specific field of a to be signed document in a specific manner within a specific time period and attribute the signature to a specific entity, verifies that the entity to which the signature is to be attributed has actually authorized creation of this signature as specified by the request, and then causes the signature to be created. The Signature Authority may also associate metadata with the signature, which may attest to the time and/or method of creation of the signature, or other types of information pertaining to the signature.

A Signature Authority may work in concert with a Presentation Authority as illustrated in FIG. 1. A Presentation Authority is a trustworthy third party in an electronic signature system that manipulates a to be signed document to form a facsimile of it that is shown to the signer, where the facsimile is a fair representation of the original but has useful properties not present in the original.

A Presentation Authority may produce a facsimile of the to be signed document that may include any of the following capabilities:

1. Facilitate sending the signature creation request by inserting the means to send this request into the facsimile.
2. Place means for controlling which fields of the to be signed document can be signed into the facsimile.
3. Place means for controlling which data fields are editable and means of validating changes to them into the facsimile.
4. Facilitate the client's rendering of the document, in cases where the client may not have sufficient capabilities to render the original document.

The Presentation Authority may produce different facsimiles for different users, depending on what actions each user should be able to take and on the capabilities of their client. Actions that are to be available to users can be described by metadata associated with the to be signed document.

A Signature Authority may work in concert with a Registration Authority which may verify, to a standard consistent with the type of signature to be created, the identity of the entity to which a signature is to be attributed and/or the identity of the entity sending the signature creation request, when the Signature Authority has not previously verified these identities and is not employing some other means to identify them.

Verifying the identity of the signer could be done at several points in the process, and could be done more than once. For example, a user may be authenticated before they are allowed to see any documents, and could be authenticated again as part of authenticating a signature creation request. A Registration Authority could be employed in any of these authentications.

A Signature Authority may also work in concert with a Certification Authority which may create digital certificates used to verify signatures made under direction of the signature authority, or to verify the identity of the entity requesting creation of a signature.

Each of these authorities makes assertions that, taken together, and if found to be trustworthy, can make it possible for the signer to trust these authorities to properly represent the to be signed document to them and to create signatures only according to their intent. These assertions may also make it possible for parties to accurately evaluate their risk of reliance on a signature created under the direction of these authorities and on any associated metadata.

A Presentation Authority asserts that the facsimile document provided to the client, when properly rendered into a visual or aural presentation, matches, in all material respects, the proper visual or aural rendering of the to be signed document that it is a facsimile of.

A Registration Authority asserts that an entity's identity has been verified to a specific standard.

A Certification Authority asserts that a private key was under control of the entity named as the subject of a valid digital certificate containing the corresponding public key at the time the certificate was issued. (Policies associated with the certificate may require the subject to retain control for at least the lifetime of the certificate.)

A Signature Authority asserts that an electronic signature was intended to be created by a specific entity, and may make other assertions about the signature, such as, for example, the policies and methods applied during its creation, or the time of its creation.

Each of these authorities may be operated by a plurality of third parties on server clusters remote from the client and possibly from each other. Some mechanism must exist so that the assertions made by these authorities can be considered authoritative.

This mechanism can be realized by extending PKI mechanisms for this purpose. There may be one or more Policy Authorities defining the rules under which Signature, Presentation, Registration and Certification Authorities (the operating authorities) do their work, and the operating authorities may make further promises about how they implement these policies. These policies and implementation commitments may describe further details of the assertions, what may be done to determine or ensure the validity of these assertions, and may provide other information pertaining to the trustworthiness of the operating authorities, such as, for example, a description of the security controls applied in the implementation of the policies. Operation of the authorities in conformity to the policies and other information may be periodically verified by audits performed by other trusted third parties.

Parties that want to rely on a signature need to be able to determine what authorities make the assertions on which the trust model depends, and under what policies these assertions are made. An authority may provide this information by placing a unique identifier for the authority, a unique identifier for the appropriate policies, and the assertions it makes in a data structure associated with the signature and digitally signed by the authority.

Authorities may make their assertions independently of one another, each having their own policies, or some may operate as subordinate to the policies of others. In this case, only the super-ordinate authority and its policies may need to be identifiable by relying parties.

For example, in one arrangement, a Certification Authority can issue digital certificates under policies that cover the operation of subordinate Registration, Presentation, and Signature Authorities. In this case, presentation of the to be signed document and use of the signer's private key to form the signature may only be allowed under control of Presentation and Signature Authorities that conform to the policies referenced in the corresponding digital certificate. Trustworthy audit trails reliably associated with the signature may be used to verify that these restrictions were followed in the formation of particular signatures.

In another possible arrangement, a Signature Authority can have subordinate Registration and Presentation Authorities, and can certify its assertions under a certificate issued to it by a separate Certification Authority with its own subordinate or independent Registration Authority.

In this arrangement, the Certification Authority can issue a digital certificate certifying a key pair held by the Signature Authority. When the client sends a signature creation request to the Signature Authority, the authority uses the private key of this pair to certify the signature. This key can be used to certify signatures for more than one signer—it is unique to the authority, not the signer. The signed data structure has a field or fields in which the authority asserts that the authenticator of the signature creation request intended the signature to be created, and that it is their electronic signature. The signed data structure also includes at least an identification of the policies under which the signature is created and a digest of the to be signed document indicated in the signature creation request. This structure must also be reliably associated with the document field indicated in the signature creation request. This can be done via any method commonly used for this purpose, such as including an identifier of the field in the signed data structure. Another common method, usable when the signed data structure is placed into a sub-field of the signature field being signed, is to include such sub-fields of all the other signable fields of the document in the document digest, and to omit only the sub-field of the field being signed from this digest. The certificate corresponding to the private key may also be packaged with the signed data structure, either inside or outside of the signed data.

In the case of signing a signature field in a Portable Document Format (PDF) document by a method of this type, for example, a Signature Authority may digitally sign the field with its own private key and certificate. Data in the signed field may indicate that the authority's digital signature certifies the electronic signature of another party on the field when the Reason entry of the signature dictionary of the field clearly states this intent. The name of the signer of the electronic signature may also be placed in the Name entry of the signature dictionary of the signed field and the name of the electronic signer may be included in the appearance of the signature when the document is rendered into a visual or aural form. This appearance may also state that the signature is certified by a Signature Authority. An identifier of the signature policy, which may, for example, be an X.500 Object Identifier, can be placed in an entry defined for this purpose in the signature dictionary and may also be included in the Reason entry of this dictionary and in the signature appearance.

In order to verify signatures of this type, a relying party would first verify the signature on the signed data using the Signature Authority's certificate. This allows the party to rely on the identity of the Signature Authority to the extent supported by the policy associated with the certificate and their willingness to trust the authorities in the certificate validation chain. The party may then rely on the Signature Authority's assertions in the signed data structure to the extent allowed by the signature policy referenced in the signed data structure and their willingness to trust the identified Signature Authority.

We now describe ways to incorporate trusted client actions into an electronic signature process containing Signature Authorities.

We describe three ways that a Signature Authority and trustworthy client components can cooperate to make a signature.

In the first way we describe to incorporate trusted client actions into a Signature Authority, a private key secured by trustworthy client components can be used to digitally sign a message that authenticates the signer as the originator of a signature creation request sent to the Signature Authority, and another private key held by the authority can be used to create the signature. The trusted client components may require the signer to authenticate using multi-factor authentication in order to access and apply the private key used to digitally sign the authentication message.

The private key held by the authority can be a key belonging to the Signature Authority which can be used to certify the signatures of a plurality of signers as described previously.

The private key held by the authority could also be a key belonging to the signer and used exclusively on their behalf. In this case, it may be a key stored in its entirety by the authority, or a key partially stored by the authority and partially on the client (as, for example, in U.S. Pat. No. 7,237,114), or a key stored in full on the client. If key portions are used, there are several methods by which they could be formed; for example, by directly dividing the actual key, or by using secret-splitting methods.

If part of the key or the whole key is stored on the client, it must be kept securely on the client side and must be securely communicated to the authority. Key portions can be kept by the signer themselves, and reentered as needed. Trusted client components can improve the trustworthiness of this process by helping secure the data path from the entry device to the Signature Authority.

Storing partial keys on the client side is more advantageous when the client's portion of the key has high entropy, but it can be burdensome for signers to keep and enter high-entropy key portions or full keys. In this case trusted client components can secure the key portions on the client machine.

In the second way we describe to incorporate trusted client actions into a Signature Authority process, a signature can be created directly by trusted client hardware or by software whose trustworthiness is verified by trusted client hardware, but the digest that is signed is formed by a Signature Authority. In this variation the private signing key remains fully in control of the signer.

One realization of this method, when applied via a Web browser to a Portable Document Format (PDF) document, for example, could work like this:

1. A user performs an action in a Web browser that causes the browser to request a document from a Presentation Authority. The Presentation Authority responds by sending a frameset to the browser, which requests display of a PDF in one of the frames. The user's browser opens the PDF in Adobe Reader, for example, embedded in the frame. Another frame holds a hidden signed applet that immediately sends a request to a Signature Authority on a secure channel and then waits for a response. The Signature Authority does not respond right away. If the request times out, the applet immediately sends another request. This continues while the user reads the document.
2. User performs actions that cause a signature creation request to be sent to the Signature Authority.
3. The Signature Authority hashes the copy of the to be signed document, forms the data structure that will be embedded in the PDF as the signature, and then responds to the applet's pending request, including this data structure in the response.
4. The applet receives the data structure and forwards it to trustworthy client components via an interface accessible to signed applets, requesting that it be signed.
5. The trustworthy client components open a dialog on the user's machine requesting the user to authenticate for signing.
6. The user authenticates to their trustworthy components. The trustworthy components insert the user's certificate in the signature data structure and then sign it with the user's private key, and return the result to the applet.
7. The applet forwards the result to the Signature Authority.
8. The Signature Authority inserts the signed data structure into the to be signed document, and finally responds to the pending signature creation request (from step 2) perhaps by redirecting to the Presentation Authority, which may respond with the next to be signed document under the direction of a workflow engine.

A similar process can be used with other document formats and with containers other than Web browsers.

The Signature Authority's role in forming the signature has to be visible to relying parties in order for them to evaluate the trustworthiness of the signature. One way to achieve this visibility is to have the client sign with a private key where the corresponding certificate was certified under a policy that describes the role of the Signature Authority in forming signatures. In this case, the Signature Authority's policy is subordinate to the Certification Authority's policy for the certificate. This method of achieving visibility of the Signature Authority has the advantage that standard signature verification methods will make the Signature Authority's role visible.

The trustworthiness of the process is improved if the policy of the signer's certificate only allows certification of keys that are protected by a secure hardware device, and whose application is under the control of a device that can be trusted to only use them to sign digests formed by a Signature Authority certified under the policy.

One method to achieve this control is to have the Certification Authority verify that the private key is protected within the secure boundary provided by trustworthy client components and is under the complete control of client mechanisms whose integrity is assured by the trustworthy components and that will only apply the key to digests from properly certified sources.

One method to certify the source of a digest is to have the authority that creates it digitally sign it, and include this signature with the digest sent to the client's mechanism that controls the key. This mechanism would verify the signature and then check that the originating authority is in a list it has, indexed by policy identifier, of authorities authorized to send digests under the policy identifier of the certificate corresponding to the private key to be used. In a variation of this method, the identity of the Signature Authority could be verified by sending the digest over a secure, server-authenticated communication channel.

The secure client signature creation mechanism that controls key application can also include features that allow restriction of what keys are acceptable to use. Restriction could be possible by both issuer and serial number of the associated certificate or roots in the verification chain, or by policy identifier pattern. This mechanism allows the Signature Authority to control how good the key strength, private key protection, and original subject authentication has to be, and therefore control the risk of relying on the completed signature. These restrictions may originate in metadata associated with the signature field to be signed, which could be set by the originators of the document. They may be communicated to the secure client signature creation mechanism along with the data structure to be signed.

Signature metadata certified by the Signature Authority can also be included in the signature. For example, the actual time of creation of the signature, within error limits stated in the signature policy, can be included in the signature. In one method for doing this, the authority may include a signing time projected from trustworthy clocks maintained by the authority (which may be offset from the current time by the expected latency) embedded within the structure to be signed that is sent to the client. When the authority receives the signed structure in response, it verifies that receipt occurred within the time provided by the error limits allowed under the signature policy. If so, it may timestamp the signature to validate it. If not, it securely destroys the signature.

In the third way we describe to incorporate trusted client actions into a Signature Authority process, trustworthy client components secure a key pair for a user. Instead of the certificate being an end-entity certificate (used for directly signing documents), it is a personal Certification Authority certificate (used to sign other certificates issued under it). This certificate has a policy that allows it to make limited-use document signing certificates, where the private key is allowed to be applied by a trusted third party, to sign documents as specified by the certificate subject, and where the subject of the subordinate certificate must match the subject of the personal Certification Authority certificate. There can be a range of these policies that differ on the original authentication of the subject.

One realization of this method, when applied via a Web browser to a Portable Document Format (PDF) document, for example, could work like this:

1. A user performs an action in a Web browser that causes the browser to request a document form a Presentation Authority. The Presentation Authority responds by sending a frameset to the browser, which requests display of a PDF in one of the frames. The user's browser opens the PDF in Adobe Reader, for example, embedded in the frame. Another frame holds a hidden signed applet that immediately sends a request to a Signature Authority on a secure channel and then waits for a response. The Signature Authority does not respond right away. If the request times out, the applet immediately sends another request. This continues while the user reads the document.
2. User performs actions that cause a signature creation request to be sent to the Signature Authority.
3. The Signature Authority forwards a signature creation request to the applet.
4. The applet receives the request and forwards it to the user's trustworthy components via an interface accessible to signed applets.
5. The trustworthy components open a dialog on the user's machine requesting the user to authenticate for signing.
6. The user authenticates to their trustworthy components. The trustworthy components generate a new key pair, and certify the private key of the pair under the personal Certification Authority certificate. They then return both the private key and certificate to the applet, and destroy their copy of the private key.
7. The applet forwards the private key and certificate to the Signature Authority.
8. The Signature Authority uses the private key to sign the document, and then immediately destroys its copy.

There are many possible variations on this process:

1. Variations where the server tells the trustworthy client components how the private key will be used. In this case the server includes, for example, the name of the document and a description of the line to be signed in the request at step 3. The trustworthy client components may show these to the user when they authenticate at step 5.
2. Further variations on variation 1, where the private key and certificate sent to the Signature Authority are packaged with explicit instructions on how the private key is authorized to be used.
   a) The response returned in step 6 can include document and signature field identifiers that specify which field of which document is to be signed with the private key.
   b) The identifiers sent to the server in variation (a) can include a hash of the document to be signed.
   c) The document hash of variation (b) could have been sent from the server in step 3.
3. Further variations on variation 2, where the response in step 6 is digitally signed by a private key kept secured by the trustworthy client components (which could be the personal Certification Authority key or another private key of the user). (This signature binds the usage instructions to the key and certificate in a way that allows tampering to be detected, and allows the receiver of the key, certificate, and instructions to authenticate the intended use of the private key.)
4. Further variations on all of the above, where the server keeps an audit log (which may be tamper resistant) of the request it sent to the trustworthy client components and/or the response it received. (Logging the signed response from variation 3 is especially advantageous for proving later that the authority properly applied the signature under proper authorization. Conversely, lack of an audit entry could indicate that the private key was compromised or misapplied.)
5. Further variations on all of the above, where multiple signatures are authorized at once.

When key pairs secured by trustworthy client components need to be certified in order to perform any of the above signature processes, generation of the key pair, issuance of the certificate, and provisioning of the certificate into the client can be made transparent to the process user, so that the PKI remains hidden and the user does not need to be directly concerned with it. Natural points for issuing certificates to a user in the overall electronic signature process exist immediately after a Registration Authority has authenticated the user. Certificates can be issued by a common process where a server requests trustworthy client components to generate a key pair and submit the public key of the pair for certification. This public key can then be forwarded to a Certification Authority along with the Registration Authority's identification of the subject, and the issued certificate can then be inserted back into a client key store secured by the trustworthy client components.

The certificates issued within this process could potentially be made by any Certification Authority.

If a user already has suitable private keys and corresponding certificates in their secure client key store, then Presentation, Signature, or Registration Authorities can detect them at appropriate points in the process, use them to authenticate or sign as needed, and skip any provisioning steps that may otherwise be needed.

FIG. 2 illustrates a signing process of an electronic document in accordance with aspects of the present invention. In particular, FIG. 2 illustrates an exemplary sequence of communications between a certification authority, an applet that is provided on a signing party's browser, the signing party of an electronic document, a signature authority, a presentation authority, an unsigned document storage database, and a signed document storage database. By following the steps and sequence shown in FIG. 1, a person skilled in the art will be able to make and use a system that presents an unsigned electronic document to a signing party via their Internet-connected computer and browser program, and is operative to have the signing party take actions to indicate their asset to signature on the unsigned document so as to created a signed document, which is then stored in a signed document storage database.

FIG. 3 illustrates a certification authority with subordinate registration, presentation, and signature authorities in accordance with an aspect of the invention.

FIG. 4 illustrates a signature authority with subordinate registration and presentation authorities in accordance with another aspect of the invention.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A system for verifying the authenticity of a digital signature associated with an electronic document, such that a relying party is enabled to rely on the fact that a signing party reliably signed the electronic document, comprising:
   a certification authority computer system configured with software instructions that upon execution generate a digital certificate certifying a cryptographic key pair of a private key and a public key for a signing party;
   a hardware storage device for storing the private key and the digital certificate for use when constructing a digital signature for indicating execution of a to-be-signed electronic document as directed from time-to-time by the signing party to create a digitally signed electronic document;
   a computer program operative on a communications network by a communications network-connected computer used by the signing party for execution of the to-be-signed electronic document and communicating with a signature authority computer system;
   the signing party's computer system having software instructions that upon execution in response to a first action from the signing party, provides a document signing request to the signature authority computer system, which document signing request identifies the to-be-signed electronic document;
   the signature authority computer system having software instructions that upon execution
      (i) obtains a copy of the to-be-signed electronic document in response to receipt of the document signing request;
      (ii) forms a signature data structure that includes a hash of the to-be-signed electronic document;
      (iii) sends the signature data structure to a trustworthy component on the signing party's computer system; and
      (iv) receives a digitally signed signature data structure from the trustworthy component for creating a digitally signed electronic document with the to-be-signed electronic document and the digitally signed signature data structure;
   the trustworthy component on the signing party's computer system configured with instructions for:
      (i) authenticating the signing party;
      (ii) upon authentication, digitally signing the signature data structure with the private key of the signing party; and
      (iii) transmitting the digitally signed signature data structure to the signature authority computer system as the digital signature for the to-be-signed document.

2. The system of claim 1, wherein the trustworthy component configured for digitally signing the signature data structure by inserting the digital certificate of the signing party into the signature data structure.

3. The system of claim 1, wherein the signature authority computer system configured for inserting the digitally signed signature data structure into the to-be-signed electronic document.

4. The system of claim 1, further comprising a plurality of policies pursuant to which the signature authority computer system operates; and further comprising the signature authority computer system configured for inserting in the signature data structure at least an identification of the one or more policies under which the signature authority computer system formed the signature data structure.

5. The system of claim 1, wherein the to-be-signed electronic document is a formatted portable electronic document and the formatted portable electronic document further comprises a location for the signature data structure in the to-be-signed electronic document as a signature field.

6. The system of claim 1, wherein the communication network facilitating the steps of interaction among the signing party computer system and the signature authority computer system comprises an Internet communication network and the computer program comprises a network browser for the communication network.

7. The system of claim 6, further comprising an application provided to the network browser for communication between the signature authority computer system and the trustworthy component on the signing party's computer system.

8. The system of claim 7, wherein the application for secure communications between the signature authority computer system and the trustworthy component on the signing party's computer system is a signed applet.

9. The system of claim 1, further comprising a policy of the signature authority computer system for forming the signature data structure, wherein said policy for forming the signature data structure is included therein by a policy for the digital certificate of the signing party.

10. The system of claim 1, further comprising a policy of the digital certificate of the signing party requires the private key to be protected by a secure hardware device.

11. The system of claim 1, further comprising a policy of the digital certificate of the signing party requires the private key to be used only to sign signature data structures formed by one of a plurality of approved signature authorities.

12. The system of claim 11, further comprising:
the signature authority computer system further configured for digitally signing the hash of the to-be-signed electronic document with a signature authority digital signature and including the signature authority digital signature in the signature data structure for sending to the trustworthy component on the signing party's computer system; and
the trustworthy component on the signing party's computer system further configured for:
verifying the signature authority digital signature on the hash of the to-be-signed electronic document; and
checking whether the signature authority computer system that digitally signed the hash of the to-be-signed electronic document is one of a plurality of approved signature authorities for the policy of the signing party's digital certificate.

13. The system of claim 1, further comprising:
the signature authority computer system further configured for including one or more parameters that define acceptable signing criteria when sending the signature data structure to the trustworthy component on the signing party's computer system; and
the trustworthy component on the signing party's computer system further configured for signing the signature data structure for the digital signature with the private key and digital certificate that satisfy the signing criteria.

14. The system of claim 13, wherein the signing criteria require the digital certificate to have issued from a specified certificate authority and have a unique serial number.

15. The system of claim 13, wherein the signing criteria require the digital certificate to have predetermined roots in a validation chain thereof.

16. The system of claim 13, wherein the signing criteria require the signer's digital certificate to have a policy identifier that matches a predetermined pattern.

17. The system of claim 13, wherein the to-be-signed document further comprises one or more metadata; and the signature authority computer system configured for determining compliance with one or more signing criteria based on a one or more of the one or more metadata.

18. The system of claim 1, further comprising the signature authority computer system configured for inserting one or more assertions about the digital signature of the signing party into the signature data structure before the signature data structure is sent to the trustworthy component on the signing party's computer system.

19. The system of claim 18, further comprising the signature authority computer system further configured for inserting into the signature data structure a time of creation of the digital signature.

20. The system of claim 19, wherein the creation time comes from a trustworthy clock maintained by the signature authority computer system.

21. The system of claim 20, wherein a policy of the signature authority computer system comprises a description of the clock as trustworthy.

22. The system of claim 18, further comprising a policy of the digital certificate of the signing party that describes a trustworthiness of the assertions about the digital signature of the signing party.

23. The system of claim 1, further comprising the signature authority computer system configured for verifying receipt of the digitally signed electronic document within a predetermined period for creating the digitally signed electronic document.

24. The system of claim 23, wherein a policy of the digital certificate of the signing party specifies the predetermined period for creating the digitally signed electronic document.

25. The system of claim 1, further comprising:
the signing party's computer system further configured for sending, in response to a second action from the signing party, a view request to a presentation authority computer system to view an unsigned to-be-signed electronic document; and
the presentation authority computer system, in response to the view request from the signing party's computer system, retrieving the to-be-signed electronic document, creating a facsimile of to-be-signed electronic document, and sending the facsimile to the signing party's computer system.

26. The system of claim 25, further comprising the signing party's computer system configured for displaying the facsimile of the to-be-signed electronic document.

27. The system of claim 26, wherein the first action from the signing party corresponds to a signing of the facsimile of the to-be-signed electronic document.

28. The system of claim 25, further comprising an application for secure communication between the signature authority and the trustworthy component on the signing party's computer system, said application configured for sending by the presentation authority computer system the facsimile of the to-be-signed electronic document.

29. The system of claim 28, wherein the facsimile of the to-be-signed electronic document and the application for secure communications between the signature authority computer system and the trustworthy component on the signing party's computer system are included in a frameset for displaying on the signing party's computer system.

30. The system of claim 25, further comprising a policy for the digital certificate of the signing party comprises the presentation authority computer system when creating the facsimile of the to-be-signed electronic document including said policy therein.

31. The system of claim 25, further comprising a plurality of policies pursuant to which the presentation authority computer system operates; and the presentation authority computer system further configured for inserting in the signature data structure at least an identification of one or more of the plurality of the policies under which the presentation authority computer system created the facsimile of the to-be-signed electronic document.

32. The system of claim 31, wherein one of the policies of the presentation authority computer system comprises at least one of a plurality of policies under which the signature authority computer system operates.

33. The system of claim 25, further comprising a plurality of policies pursuant to which the signature authority computer system operates; and the signature authority computer system configured for inserting in the signature data structure at least an identification of the one or more policies under which the signature authority computer system formed the signature data structure.

34. The system of claim 33, further comprising a plurality of policies under which the presentation authority computer system operates; and the presentation authority computer system further configured for inserting in the signature data structure at least an identification of a one or more of the plurality of policies under which the presentation authority computer system created the facsimile of the to-be-signed electronic document.

35. The system of claim 34, wherein one of the policies of the signature authority computer system comprises at least one of the plurality of policies under which the presentation authority computer system operates.

36. The system of claim 25, further comprising the presentation authority computer system configured for inserting into the facsimile of the to-be-signed electronic document means for sending the document signing request.

37. The system of claim 25, wherein the facsimile specifies one or more of a plurality of fields of the to-be-signed document that can be digitally signed by the signing party.

38. The system of claim 25, wherein the facsimile facilitates rendering of the to-be-signed electronic document on a display available to the signing party.

39. The system of claim 25, wherein the facsimile designates one or more fields in the to-be-signed electronic document that may be edited.

40. The system of claim 39, wherein the facsimile further comprises software that validates changes to the editable fields.

41. The system of claim 1, wherein the storage device comprises cryptographic hardware for storing the private key.

\* \* \* \* \*